(12) United States Patent
Waris (10) Patent No.: US 8,082,451 B2
(45) Date of Patent: Dec. 20, 2011

(54) DATA ACCESS CONTROL (75) Inventor: Heikki Waris, Helsinki (FI)

(73) Assignee: Nokia Corporation, Espoo (FI)

( * ) Notice: Subject to any disclaimer, the term of this patent is extended or adjusted under 35 U.S.C. 154(b) by 1186 days.

(21) Appl. No.: 11/224,617

(22) Filed: Sep. 12, 2005

(65) Prior Publication Data

US 2007/0061456 A1 Mar. 15, 2007

(51) Int. Cl.
H04L 9/00 (2006.01)
G06F 21/00 (2006.01)

(52) U.S. Cl. ............................................ 713/193; 726/2
(58) Field of Classification Search .................... 726/30, 726/2; 713/193
See application file for complete search history.

(56) References Cited

U.S. PATENT DOCUMENTS

| | | | |
|---|---|---|---|
| 4,701,840 A * | 10/1987 | Boebert et al. ..................... 726/4 |
| 2002/0157002 A1 | 10/2002 | Messerges et al. ........... 713/155 |
| 2003/0101190 A1 | 5/2003 | Horvitz et al. ................. 707/100 |
| 2003/0177248 A1 * | 9/2003 | Brown et al. ................... 709/229 |
| 2004/0148503 A1 | 7/2004 | Sidman .......................... 713/167 |
| 2005/0086511 A1 | 4/2005 | Balacheff et al. .............. 713/200 |
| 2006/0026672 A1 * | 2/2006 | Braun .................................. 726/9 |
| 2007/0162398 A1 * | 7/2007 | Tadayon et al. ................. 705/54 |
| 2008/0289048 A1 * | 11/2008 | Jeong .............................. 726/27 |
| 2009/0113088 A1 * | 4/2009 | Illowsky et al. ................. 710/62 |

FOREIGN PATENT DOCUMENTS

WO WO 03/096585 11/2003

* cited by examiner

*Primary Examiner* — Nasser Moazzami
*Assistant Examiner* — Lisa Lewis
(74) *Attorney, Agent, or Firm* — Harrington & Smith (57) ABSTRACT

A data handling mechanism, wherein a small binary tag is appended to data (each message and file) for controlling the access and handling of the data. The tag contains dedicated bits for indicating its various usage rights such as copying, forwarding, editing and also right to edit the tag itself. The tag is created by an author of the data or by any other party handling the data, including middleware agents and possible recipients of the data based on contextual information such as network or ownership domain of the author and/or of the recipient.

21 Claims, 2 Drawing Sheets

DATA ACCESS CONTROL

FIELD OF THE INVENTION

This invention relates to data access control. It relates particularly, but not exclusively, to data access control in mobile communications.

BACKGROUND OF THE INVENTION

Information is very easy to distribute in the modem information society in electric form. Messages and computer readable files of various types can be sent individually or to predetermined or even non-defined groups of recipients using e-mail, Internet newsgroups, instant messaging, Multi-media Messaging Service (MMS) and Short Message Service (SMS). The last two of the examples are services provided by modem cellular telecommunications networks, the others are Internet enabled services and also supported by the modem mobile phones.

The ease of communications has also brought about new difficulties with access control as copyrighted, confidential, private and corporate owned data are stored and communicated to different recipients. To control data access, various mechanisms have been devised. For instance, particular infrastructure solutions have been developed, including firewalls, closed intranets, password protected encryption of documents provided by office suit applications such as Microsoft Word™ and PKZip™ and dedicated encryption applications including PGP (Pretty Good Privacy). Also World Wide Web (WWW) based home pages are provided in markup languages such as Hyper-Text Markup Language (HTML) and access controlled by passwords. The access control of data also covers controlling the manipulation of data, such as printing, copying, editing and redistributing. Digital Rights Management (DRM) and different certification systems designed by the Open Mobile Alliance™ (OMA) and Verisign™ among others, respectively, enable authentication and integrity protection of content so that one could trust that the data originates from given source and is somewhat reliable (Verisign™) and so that rights of the owner of the data are respected. Some applications such as Adobe Acrobat Reader™ protect content against editing, copying and printing for documents when used to view the content. OMA DRM takes an extra step and also should prevent unauthorized distribution of content to protect businesses such as ring tone sales against free copying.

It is noteworthy, however, that any content protection that yet allows a user to actually see and/or hear protected content is yet quite exposed to simple copying with a suitable media recorder or by tapping to the wires of user's own data output device such as loudspeakers. The quality may slightly degrade, but this risk still exists. Moreover, the application specific data access control measures such as passwords imposed by office applications are typically easy to break with commonly available software. The encryption or other access protection also typically involves prompting and reading a password or smart card from the user, which may be perceived as too laborious for normal documents such as personal e-mails. Legitimate use is also complicated and even frustration may be caused when content protection hinders taking normal back-up copies, for instance. As result, probably most of present non-public electric content is yet unprotected and uncontrolled and thus can easily spread in an undesired manner even without any bad intention.

SUMMARY OF THE INVENTION

It is an objective of the invention to avoid or at least mitigate the problems found in prior art.

According to a first aspect of the invention there is provided a data unit comprising control information for controlling the handling of the data unit, wherein the control information comprises a binary representation of data handling conditions intended to govern the access to the data unit Advantageously, the data unit allows storing access conditions into a minute tag in the data unit so that subsequent handling can account for possible restrictions in the handling of the data unit. The handling may involve any one of accessing the data unit, modifying the data unit, electronically copying information from the data unit, forwarding the data unit and passing the data unit beyond a particular domain.

The data unit may consist of or contain a file or message. Advantageously, the physical placement of the control information in the data unit may be converted on changing the representation of the data unit, for example, when turning a file into a message or vice versa.

The data unit may contain a modification indicator to indicate whether electric modifying of data unit is permissible. Advantageously, the modification indicator may be used to selectively allow producing electric derivatives of the data unit or to disallow that. With material equipped with the modification indicator it is easy to define whether and to what extent modification is allowed.

The modification indicator may indicate whether the modification of the control information itself is permissible. If yes, then a subsequent user may update (add, change or remove) any or all of the handling conditions. This may be particularly useful by providing means for efficient collaboration with other people or organizations.

The data unit may contain a data classifier for application independent classification of the data unit into given categories so as to categorically control the handling the data unit.

According to a second aspect of the invention, there is provided a data handling manager for controlling the handling of information, comprising means for providing a data unit with handling conditions according to the first aspect of the invention.

The data handling manager may contain means for creating or updating the control information. The data handling manager may contain means for forming the tag based on detection of the source of the data unit; other state information; and local policies. The data handling manager may additionally or alternatively be capable of any one of the following: merging tags, copying tags or deriving tags from other tags.

The data handling manager may reside at a client device, at an intermediate unit such as a data server or at a dedicated networked unit accessible to a client device or to an intermediate unit such as a data server.

According to a third aspect of the invention, there is provided an element comprising the data handling manager of the second aspect. The element may be selected from a group consisting of: a data terminal; a data server; a computer program for controlling a data terminal; a computer program for controlling a data server; a component comprising a computer program for controlling a data terminal; a component comprising a computer program for controlling a data server; a memory medium comprising a computer program for controlling a data terminal; and a memory medium comprising a computer program for controlling a data server.

The data terminal may be a messaging agent. The messaging agent may be a recipient and/or a sender of a message. Advantageously, the handling conditions may be added or updated by the recipient of a message and/or by the sender of the message.

The data terminal may be capable of querying a server for the handling conditions. The server may be a Domain Name Server (DNS).

According to a fourth aspect of the invention there is provided a data processing device capable of receiving a data unit comprising control information that contains data handling conditions; wherein the data processing device comprises:
- means for obtaining the data handling conditions from the data unit, and
- means for verifying the data handling conditions and subjecting predetermined data processing actions to the data handling conditions.

Advantageously, the data processing device may verify any type of data for any application using the handling conditions in a similar fashion and thus implement a universal data access rights management.

The data processing device may have a logical relationship with the data unit so that the data processing device is one of the following: a recipient and a sender.

According to a fifth aspect of the invention there is provided a method of creating or updating a data unit, comprising the steps of:
- obtaining a data unit;
- generating data handling conditions intended to govern the access to the data unit;
- generating control information for controlling the handling of the data unit, wherein the control information comprises a binary representation of the data handling conditions; and
- containing the control information in the data unit.

According to a sixth aspect of the invention there is provided a computer program for controlling a data handling manager to create or update a data unit, comprising:
- computer executable program code for causing the data handling manager to obtain a data unit;
- computer executable program code for causing the data handling manager to generate data handling conditions intended to govern the access to the data unit;
- computer executable program code for causing the data handling manager to generate control information for controlling the handling of the data unit, wherein the control information comprises a binary representation of the data handling conditions; and
- computer executable program code for causing the data handling manager to contain the control information in the data unit.

According to a seventh aspect of the invention there is provided a computer program for controlling a data processing device capable of receiving a data unit comprising control information that contains data handling conditions; wherein the computer program comprises:
- computer executable program code for causing the data processing device to obtain the data handling conditions from the data unit, and
- computer executable program code for causing the data processing device to verify the data handling conditions and subjecting predetermined data processing actions to the data handling conditions.

According to an eighth aspect of the invention there is provided a file system capable of storing data units and associated control information logically together, wherein the control information contains data handling conditions intended to control the valid use of the information independent of the application for which the data is intended among a plurality of applications.

The file system may be extended from that of known file systems such as FAT and NTFS in that in enables logical storing and retrieval of the control information together with the data unit. The control information may be physically stored together or separate of the data unit, but advantageously the file system is capable of producing the control information to any application that attempts accesses the data unit. Alternatively, the file system may be configured to refer access to the data unit to a data handling manager for access right resolving prior to handing over the data unit to a requesting application.

According to a ninth aspect of the invention there is provided a protocol stack capable of forming the control information, comprising:
- means for obtaining a data unit;
- means for generating data handling conditions intended to govern the access to the data unit;
- means for generating control information for controlling the handling of the data unit, wherein the control information comprises a binary representation of the data handling conditions; and
- means for containing the control information in the data unit.

Various embodiments of the present invention have been illustrated only with reference to the one aspect of the invention for sake of briefness, but it should be appreciated that corresponding embodiments may apply to other aspects as well.

BRIEF DESCRIPTION OF THE DRAWINGS

The invention will now be described, by way of example only, with reference to the accompanying drawings, in which.

DETAILED DESCRIPTION

Figure 1:
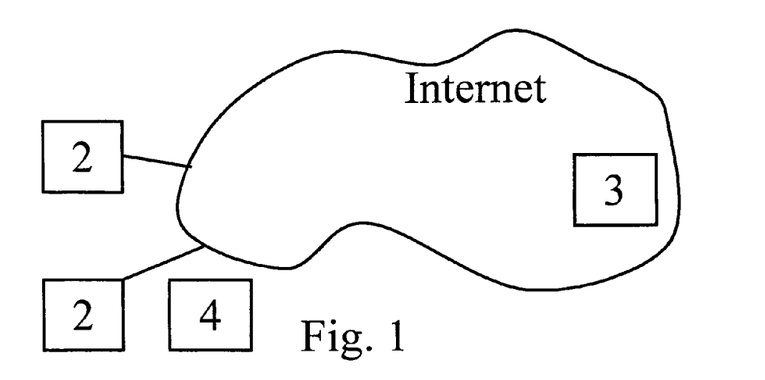
FIG. 1 presents a data ownership mechanism for data access control between network domains in the context of communications in an Internet protocol (IP) network according to an embodiment of the invention.
Figure 2:
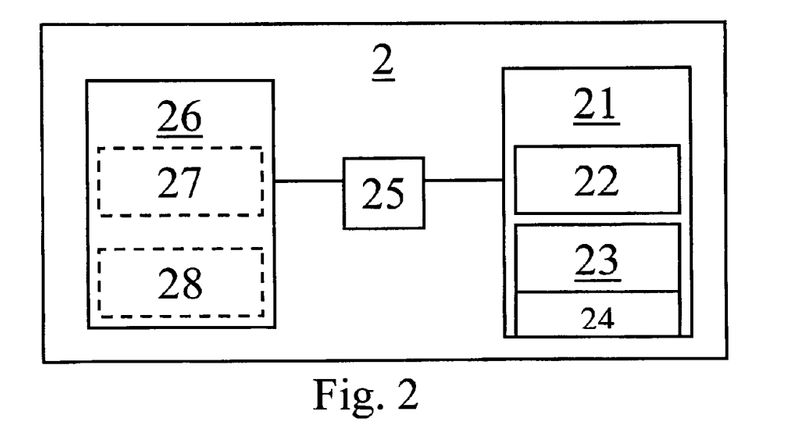
FIG. 2 shows the general structure of an IP terminal according to an embodiment of the invention.

FIG. 1 presents an exemplary embodiment of a data ownership mechanism for data access control between network domains in the context of communications in an Internet Protocol (IP) network, that is, a network typically (possibly backwards) compatible with IP version 4. FIG. 1 comprises an illustrative cloud denoting the IP network 1 (typically the Internet or a correspondingly operating intranet), a plurality of IP terminals 2, a Domain Name Server (DNS) 3, and an IP packet 4 traveling in the IP network 1. The IP terminals 2 and the servers in the IP network 1, including the DNS server 3 each include normal computing equipment and have a basic structure as in FIG. 2 showing the general structure of an IP device or terminal 2.

The IP terminal 2 contains a memory 21 including a work memory 22 and a persistent memory 23 that stores operation instructions or software 24. The software can implement a file system and/or a protocol stack according to embodiments of the invention. The IP device 20 further comprises a processor 25 for controlling the operation of the IP device 20 in accordance with the software 24. Further, the IP terminal 2 comprises an Input/Output (IO) block 26 for exchanging IP packets. The 10 block may contain a wired data port 27, a wireless data port 28 such as an Infra-Red (IR) port, a Low-Power Radio Frequency (LPRF) module (such as a Bluetooth module) or a cellular or satellite communications block. Basically, it is sufficient for understanding the following description to assume that the different entities (servers and clients) are typically functions provided by means of software in a multipurpose fixed or wireless computers or communications devices and that one device may actually run one or more client and/or server functions at the same time. A client generally refers to a device that can access a service shared over the IP network 1 by a server.

The present invention relates to creating, obtaining, managing and using particular data access control tags. Considering next the scope of data ownership with inbound and outbound IP network traffic, tags can be utilized with varying degree of data flow detail and tagging accuracy. A division of potential implementations into three types is presented in the following, in increasing complexity:

1. The data ownership mechanism is used in a very limited way without support in most networks or terminals. The tags are resolved autonomously in the terminal based on local configuration, and identify owners at ownership domain level. Multiple individual owners are aggregated into a group among which the terminal or user can assume similar owner preferences.
2. The terminal can resolve network domain, node or user specific tag information with DNS queries configured into the DNS server records by network domain owners who support the data ownership mechanism.
3. Remote end points also support data ownership. Owner preferences and/or Identification Data (ID) are included in IP headers or connection signaling. This leads to a packet or flow level tag resolution.

Regarding the coexistence of local and remotely defined tags, there are two alternatives:

Local configuration is only a user guess, and a remote tag fetched with DNS reflects the true owner preferences better because it is configured and maintained by the system administrator of the network domain. Therefore, the remote tag overrides local configuration.

The tag available from the remote DNS server is only a best approximation that applies to average external nodes. The user can tailor the tag to reflect his unique relationship with the owner of the network domain, and therefore the local configuration overrides the remote tag.

A first embodiment of the invention makes use of the DNS based approach. The local configuration is used by default if it exists, and the remote tag is used only if no local configuration is found. This allows the users to configure more specific tags for their commonly accessed network domains.

Data Ownership Components

Figure 3:
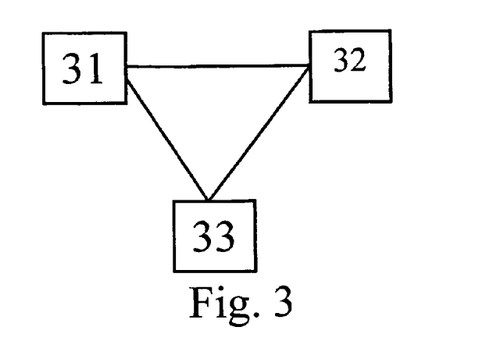
FIG. 3 shows three functionally separate major components into which data ownership mechanisms can be divided according to an embodiment of the invention.

FIG. 3 shows three functionally separate major components into which data ownership mechanisms can be divided. These components are accessible to each other over the IP network and denoted as follows:

31. Ownership policy Manager (OPM) is typically a piece of software stored in the memory of a client and of a server. The OPM controls overall data ownership resolution. It initiates the resolution, manages the identification of the data owners and preferences, derives the decision for the given data object, and provides this to the policy enforcement.

An OPM client is a part of an application or service that uses data ownership services provided by an OPM server. Its main purpose is to implement an API used for ownership queries and responses. The OPM client may also be capable of triggering the resolution and then enforcing or implementing the resolved ownership decisions.

An OPM server is responsible for extracting ownership related identity information from queries it receives from the applications, querying the name resolution for a matching tag, making decisions based on the owner identity and preferences contained in the tag, and communicating this decision back to the OPM client.

32. Ownership Database (ODB), typically stored in the memory of a server, stores and maintains the owner identities and owner preferences as well as resolution state information allowing the OPM to make consistent decisions for the various data objects. The owner identities are stored as domains and preferences as tags. The OPM server queries the ODB for this information. The ODB contents may be dynamic in that they do not contain local, user configured owner information. Notice that the ODB can be stored on the client or server. If using a locally defined hosts file, for example, the ODB can be configured or stored separately in the client. Alternatively, the ODB may be cached and accessed by OPM "server" (indirectly by application "client") or if querying records from a Domain Name Server (DNS), the ODB can be stored outside terminal but query tag responses be then cached; optionally client may store some tag results.

33. The Domain Name Resolver is modified and extended so that it can receive owner tag queries from the OPM server, handle new DNS resource record types, and interpret local name definitions so that existing files can store owner preference tags. The existing DNS servers need not be modified, but their configuration files that contain the network domain name information are enhanced with additional ownership resource records. It is known in the art that these records can be adapted.

Figure 4:
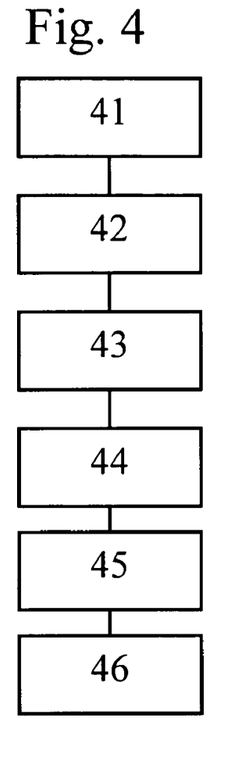
FIG. 4 shows main steps of data ownership resolution according to an embodiment of the invention.

The ownership resolution is triggered by the applications that, being aware of the content, are most capable of enforcing the ownership results. The applications trigger the resolution while managing the I/O of the data objects. The resolution then proceeds with the following main stages shown in FIG. 4:

41. The application OPM client makes a query to the OPM server in order to receive the owner policy decision for the received or sent data.

42. The OPM server extracts a Remote End point Identifier (REPI) from the OPM client query, checks if the REPI belongs to one of the known ownership domains and decides whether it needs to resolve a new owner preference tag for the ownership domain (OD). If the end point lies outside any of the known ODs, the resolution ends with no policy enforcement. This would then be given as a response to the OPM client.

43. The OPM server reformats the remote end point identifier into a parameter in its query to the name resolver. With this query it retrieves the OD's owner preference tag.
44. The name resolver first searches for the tag related to the given OD in the locally configured hosts file. If there is no match, it checks its cache tree. If there is still no match, it makes a query to the remote DNS server of the end point. If there is also no DNS owner resource record for the end point, the tag resolution ends with no tag found. Based on this response, the OPM server can give the decision "no policy enforcement" as its response to the OPM client.
45. The OPM server receives the tag from the name resolver. With the end point OD and owner preference information it makes the ownership decision that tells how the data object should be treated. It gives this decision as a response to the OPM client.
46. The application OPM client receives the decision and enforces it in a way that is suitable with the protocols it uses, for example:
   Allow/deny use of data in inbound/outbound connection, or
   Allow/deny use of data in inbound/outbound transaction.

Ownership Policy Manager Example Symbian Implementation

In an example implementation of the invention on Symbian, the OPM server provides an API for OPM clients to make queries about the remote end points with which they have traffic, and resolve the corresponding tags and access control decisions related to their ODs. The functionality in the example is limited to allowing or denying the traffic with the particular remote end point. In this case, the OPM clients may reside in various components:
   Application or service having a connection with a remote end point.
   Application or service conducting a transaction with a remote end point.
   Application or service exchanging data with another terminal internal application or service.
   Middleware monitoring the terminal connections with remote end points.

API with OPM Clients

The OPM server API receives queries from application or service in order to resolve tag and decide access control for the OD. The application query uses the following method:
TUint RDataOwnershipResolver::OwnershipQuery(TUint16 TQueryIndex, TUint16 TRefIndex)

This resolves the tag and access control decision from the identifier provided by the OPM client. The TQueryIndex is an index to a Query Table, which also contains a placeholder for the OPM server decision. The TRefIndex is also an index to a Query Table, and is used for outbound data traffic only. It is used if the query relates to a previously identified inbound traffic, i.e. if the data in question was previously received from the network. It is NULL if this query is for inbound data traffic, or if the outbound data was not originally received from the network.

The OPM server sends the resolved tag and access control decisions related to the OD as a response to the OPM client using the following method:
void RDataOwnershipResolver::OwnershipResponse(TUint16 QueryIndex, TUint8 OwnerIndex).

API with the Name Resolver

The name resolver receives queries from the OPM server in order to resolve tag based on the DNS ID provided in the OwnershipQuery. The query method is as follows:
TUint CDataOwnershipResolver::OwnerTagQuery(TUint16 TRefIndex, TText TOwnerID, TUint Type)

This resolves the tag from the identifier provided by the OPM server. The TRefIndex is an index to a Query Table. OwnerID is the tentative owner ID domain name to be resolved.

The name resolver sends resolved tag related to the OD to the querying OPM server. The response method is as follows:
void CDataOwnershipResolver::OwnerTagResponse(TUint16 RefIndex, Tag) The Tag contains the set of fields pointed to by the OwnerIndex field.

Query Table Format

In the OwnershipQuery the OPM client identifies the networked entity with which traffic is exchanged for the purpose of resolving the tag related to that OD. The query may contain the following information:
   The 16-bit query index identifies the decision specific to the OD and data traffic direction pair.
   The 8-bit owner index is used for referring to and finding the OD (and its related tag) to which the remote end point belongs.
   The decision is a Boolean variable describing the access control decision that the querying application or service should apply to the data, with value zero for allowing and value one for denying the data traffic.
   An IPv4 address of the remote end point is indicated by one 32-bit field containing the full address.
   An IPv6 address of the remote end point is indicated by four 32-bit fields that make up the full 128-bit address.
   The peer mask is a bitmask applied to the IPv4 or IPv6 address, indicating an address range.
   The peer name is a 255 ASCII character array containing a tentative owner ID domain name similar to the corresponding tag field. Either the peer name or one of the peer addresses can be null for the query.

TABLE 1

Query Table

| Column Name | Description | Type | Null? |
|---|---|---|---|
| QUERY_INDEX | Query and decision index | TUint16 | No |
| QUERY_OWNER_INDEX | Pointer to OD and subdomain index | TUint8 | No |
| QUERY_DECISION | Decision to allow or deny | TBool | No |
| QUERY_ADDR_IPV4 | Peer IPv4 address | TText | Yes |
| QUERY_ADDR_IPV6_A | Peer IPv6 address, highest 32 bits | TText | Yes |
| QUERY_ADDR_IPV6_B | Peer IPv6 address, second highest 32 bits | TText | Yes |
| QUERY_ADDR_IPV6_C | Peer IPv6 address, second lowest 32 bits | TText | Yes |
| QUERY_ADDR_IPV6_D | Peer IPv6 address, lowest 32 bits | TText | Yes |
| QUERY_PEER_MASK | Bitmask length to identify peer address range | TUint8 | Yes |
| QUERY_PEER_NAME | OwnerID as URI: user@host, user@domain, host, or domain | TText | Yes |

Ownership Database Structure

Multiple queries (QueryIndex) may point to the same OD (OwnerIndex). Each OD has only one owner preference tag. The end point identifiers in the query need to match the end point identifier range in the OD's OwnerID after mapping. For an outbound query, the OD may be already provided if the data was received from a known network domain. Therefore, the relationship of the ownership resolution data objects can start from the query made by application OPM client to the OPM server as follows:

| | |
|---|---|
| QueryIndex | (identifies the unique decision) |
| PeerAddr | (end point IPv4 or IPv6 address) |
| PeerMask | |
| PeerName | (array of 255 ASCII characters) |
| DataDirection | (used at query time, otherwise empty) |
| Decision | (allow or deny) |
| OwnerIndex | (identifies the unique owner as domain) |
|   DataDirection | (during storage) |
|   GlobalDefFlags | |
|   LocalDefFlags | |
|   PrefFlags | (contains owner's data use preferences) |
|   Timestamp | |
|   OwnerID | |

The structure in the resolution is not visible to the name resolver and through that to the users because the OPM server manages the mapping and matching of query end point identifiers and OD owner identifiers. In this implementation example, the RefIndex can be used instead of OwnerIndex because it can be used as an index of the owner OD and tag information.

Initiation of Data Ownership Resolution

The applications and services can easily detect when they are initiating an outbound connection or transaction, and perform a data ownership query for that traffic using their OPM client. After connecting to a socket by hostname, including a successful name lookup, the ownership tag is extracted from the name record. Based on the ownership decision contained in the tag, the requesting application or service will then either proceed with establishing the connectivity, or cancel the action before it has started.

For inbound connections, the handling of data ownership is more demanding. The remote end point originates the connection or transaction. The local application or service has an active listening socket open for inbound connections, and does not decide whether it should proceed with establishing the connectivity. The application's OPM client needs to trigger the ownership resolution for inbound connections.

Figure 5:
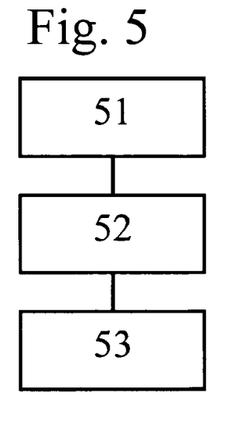
FIG. 5 shows a flow chart on initiation of resolution for inbound data traffic according to an embodiment of the invention.

The initiation of resolution for inbound data traffic happens with the following modifications shown in FIG. 5 as following process steps:

51. Application uses the function Listen( ) to receive inbound connection attempts, after which the client interface starts to maintain a receive handler object. The application is extended so that it establishes a session to OPM server using RDataOwnershipResolver as soon as it executes the Listen( ) function.

When there is an inbound connection attempt, Listen( )calls the function receive( )for accepting it. This is extended so that immediately before receive( )the application uses function getpeername( )to get the remote end point address of a connected stream socket. The getpeername( )is part of the standard C/POSIX socket operations supported by Symbian, but it only works for TCP connections. In order to initiate resolution for inbound data using other transport protocols such as UDP, the applications can use other information.

52. The application's OPM client then either first resolves the address into an OD name using the function gethostbyaddr( ) and makes a query to RDataOwnershipResolver with the domain name as the OwnerID, or uses the end point address directly in the query.

53. If the application client issues the function StopListening( ), the client interface cancels the receive handler object and the inbound connection attempts are no longer received.

OPM Resolution Structure

A large part of ownership resolution takes place in the OPM server, which receives queries from application's OPM clients and makes its tag queries to the name resolver.

Figure 6:
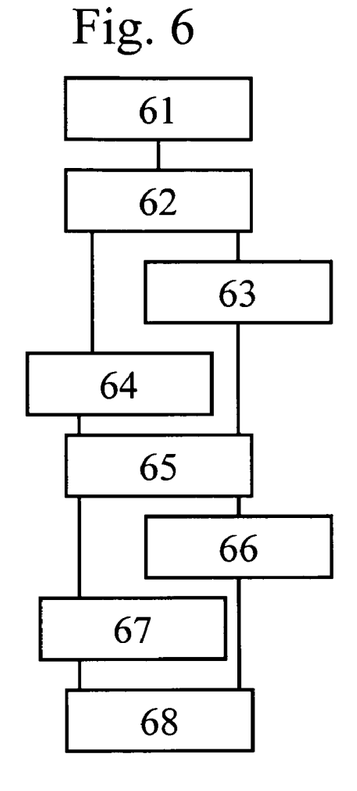
FIG. 6 shows major steps for an Ownership Policy Manager (OPM) server handling of a new ownership resolution query from application according to an embodiment of the invention.

FIG. 6 shows major steps for an OPM server handling of a new ownership resolution query from an application. Notice that a data object is abbreviated as "flow" whilst other types of information exchange are equally applicable.

61. Receive OwnershipQuery( ) from the OPM client and confirm that the query format is correct and parameter value within their ranges. The query must contain an end point name or address.

62. If the flow is an outbound flow and the owner index field of the query is null, return an "access allowed" decision to the application's OPM client. The lack of referred owner index means that the data object belongs to the user.

If a matching OD is found, the data is not protected because user is sending it to one of the known ODs trusted to properly handle user's data.

Even if no matching OD is found, the data is not protected because user is actively trying to send it.

63. If the flow is an outbound flow and the query includes a value in the owner index field, the data object was received from the referred owner's OD and belongs to him.

If no matching OD is found, the application query is erroneous or the system has erroneously lost the domain records indicated by the owner index.

If a matching OD is found, the outbound flow adopts the OD of the earlier inbound flow. The OPM server then transforms the found OD identifier into a format that can be handled in the name resolver, using the CreateResolvableID( ) function. It then makes the tag query to the name resolver with OwnerTagQuery( ). The subsequent OwnerTagResponse( ) from name resolver can be associated with the query by including the application query index in the OPM server's query to the name resolver if an asynchronous API is in use.

64. If the flow is an inbound flow, the owner index field is null, and the OPM server just needs to resolve the owner's OD.

If no matching OD is found, the data is received from an end point outside of the known ODs, such as Internet. OPM server returns an "access allowed" decision to the application's OPM client because the data is public.

If a matching domain is found, the data object belongs to that OD. The OPM server searches for earlier decision made for that OD.

If no earlier decision is found, a new owner index record is created and the end point identifiers are copied from the application query. OPM server transforms the end point address or name identifier of the query into a format that can be handled in the name resolver, using CreateResolvableID( ) function. It then makes the tag query to the name resolver with OwnerTagQuery( ).

If an earlier decision is found, OPM transforms the found OD identifier into name resolver format using CreateResolvableID( ) function. It then makes the tag query to the name resolver with OwnerTagQuery( ). This allows the tag to change between separate decisions. A timer could also be added to control the rate of new queries for the same OD, e.g. by taking into use the timestamp field in the previously resolved tag.

65. Receive OwnerTagResponse( ) from the name resolver and confirm that the query format is correct and parameter value within their ranges. The query must refer to an owner index contained in the preceding OwnerTagQuery( ).

66. If the response contains no tag, the query end point identifier or resolved OD identifier did not result in a match in either hosts file, cache or query to a remote DNS server. The OPM server can retry with different versions of the identifier, if there are any. It creates a new QueryID using CreateShorterID( ) function and sends this in a new OwnerTagQuery( ).

For example, the OPM server first tries the most detailed MX record, and if there is no match it subtracts the user part and tries the resulting host name or address to get progressively less specific names: user@host→user@domain→host→OD, whereby the attempts grow less specific in the direction of arrows.

The domain can be structured into a two level hierarchy (e.g. DNS host level and DNS domain level).

If the identifier cannot be reduced any further, there is no tag and therefore owner preferences for this OD. OPM server returns an "access allowed" decision to the application's OPM client because the owner of the OD implicitly allows the data to be treated as public.

67. If the response contains a tag, OPM server assigns it to a newly generated owner index or refreshes the tag in a referenced existing owner index. It then searches the query that initiated the tag resolution.

If the tag is the same as the previous one, OPM server can simply apply the earlier decision.

If the tag is different from the previous one, OPM server makes decision with DecideAccess( ) function.

68. OPM server sends the decision to the OPM client using OwnershipResponse( ), including the reference to the preceding query from OPM client.

OPM Server, ODB and Name Resolver Interaction

The OPM server searches ODB for application QueryIndex and OwnerIndex contents as follows:

FindByOwner(PeerName, PeerAddr) method finds the domain by matching the PeerName or PeerAddr with corresponding selectors of the ODB owner OD table.

FindByRefIndex(RefIndex) method finds the OD by matching the RefIndex pointing to an owner OD with the ODB owner OD table entries.

FindQueryByRefIndex(RefIndex) method finds the OwnershipQuery that initiated the resolution and decision for owner OD specified by the RefIndex. RefIndex is matched with the Refindexes contained in each of the OwnershipQueries stored in ODB. The oldest query is chosen if multiple are found.

The OPM server interaction with the name resolver, except for the OwnerTagQuery( ) and OwnerTagQuery( ) described earlier, consists of reformatting the end point or OD identifiers used in the queries and responses as follows:

CreateResolvableID(&Type, &QueryID, InputID) method takes a PeerName or PeerAddr as input and stores a QueryID that is formatted into a character string that can be given as argument to name resolver functions GetByAddress( ) or GetByName( ).

Treatment of Data Use Preferences

Figure 7:
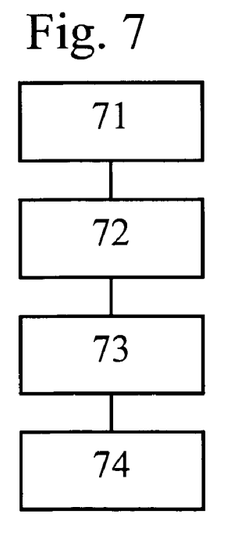
FIG. 7 shows an OPM server handling of access control decision for the data object queried by the application according to an embodiment of the invention.

FIG. 7 shows an OPM server handling of access control decision for the data object queried by the application typically in the DecideAccess( ) function according to an embodiment of the invention in the steps of:

71. Compare source OD identifier (referred OD identifiers) and destination OD identifier (query end point). If the ODs match completely, continue. If they do not, look at the distribution and granularity flags.

If distribution and granularity flags are not set, OD difference has no effect and resolution can continue to the next step.

If distribution flag is set but granularity flag is not, data can be shared across the whole parent OD. Use a more generic identifier derived from the query end point. If this matches, resolution can continue to the next step. Otherwise resolution results in "access denied".

If distribution flag is not set but granularity flag is, data can only be shared across the subdomain. The ODs do not match and therefore resolution results in an "access denied" decision.

If both distribution and granularity flags are set, data can only be shared with the explicitly stated OD. The ODs do not match and therefore resolution results in an "access denied" decision.

72. If interpretation flag is not set and the comparison of OD identifiers resulted in an "access denied" decision, the decision is changed into an "access allowed" decision if the granularity flag is also not set.

73. If duplication flag is set, it will be included in the OwnershipResponse( ) to the OPM client.

74. If integrity flag is set, it will be included in the OwnershipResponse( ) to the OPM client.

The default decision is "allow", with value zero (0) for the least significant bit of decision. Value one (1) means "deny". Duplication and integrity flags are copied into the following least significant bits of the decision, and will be enforced by the application. Table 5 contains a sample algorithm for an OPM server to execute when making access control decision for the data object.

Tag Resolution

The OPM server queries tag contents from the name resolver during its ownership resolution process. The name resolver uses the local hosts file, cache and remote DNS servers to find the correct tag for the owner. Therefore, the same mechanism is used both for storing and accessing local configuration as well as retrieving tags directly from the owners' ODs.

Tag resolution takes place in the name resolver. It is modified by adding a request handler for the OPM server's CDataOwnershipResolver, modifying the results of hosts file lookups, modifying cache lookups with a changed cache tree structure, and adding support for the new ownership resource record type in DNS queries. The OPM server is responsible for storing the resolved tag information into the ODB.

Figure 8:
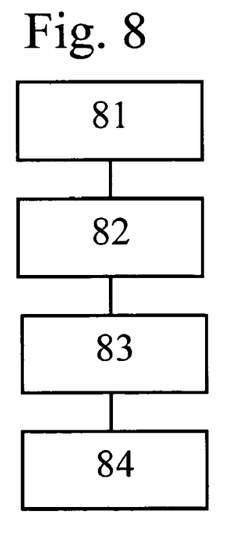
FIG. 8 shows handling of a tag resolution query from OPM server according to an embodiment of the invention.

The request handler of the name resolver manages each tag query from and response to the OPM server. The name resolver interface need not be changed. It is enough to add a tag field to the TNameRecord class passed between a client and the socket server. FIG. 8 shows the operation of the name resolver according to an embodiment of the invention, with the following steps:

81. Receive OwnerTagQuery( ) from the OPM server. The query must contain an end point name or address in a character string.

82. Check if the tag has been defined for the given end point identifier in the hosts file. Return tag to OPM server using OwnerTagResponse( ) if found.

83. If there is no match in hosts file, check if the tag has been included in name resolver cache as a result of an earlier successful DNS query to the DNS server responsible for the OD that includes the end point identifier. Return the tag to the OPM server using OwnerTagResponse( ) if found.

84. If there is no match in cache either, make a DNS query.
   If there is no match from the DNS query, the tag resolution has failed for this end point identifier. Return a null tag to OPM server using OwnerTagResponse( ).
   If there is a match from the DNS query, cache the resolved tag and then return it to OPM server using OwnerTagResponse( ).

Hosts File

A typical hosts file contains on each line an address, the hostname corresponding to that address, and aliases of the hostname. The fields are separated with spaces or tabs, and a hash mark indicates comment. The tag resolution related modifications should not cause any errors when incompatible resolvers read modified hosts files, or when modified resolvers read unmodified hosts files. The comments should also remain comments. Due to these requirements, the alias hostnames are used in the solution.

If a tag can be locally configured for the host, it needs to be written in the first alias of the hostname. The format of this artificial alias is "<tag>.<hostname>.own", where "hostname" is the original hostname, "own" indicates an ownership resource record type in this embodiment of the invention, and "tag" encodes the following tag fields into eight hexadecimal characters:
   GlobalDefFlags (00 in this design)
   prefFlags (xx masked with 0x7e in this design)
   Timestamp(0000 in this design)
An example modified entry would be as follows: "10.0.0.1 host.example.com 00320000.host.example.com.own host".

Figure 9:
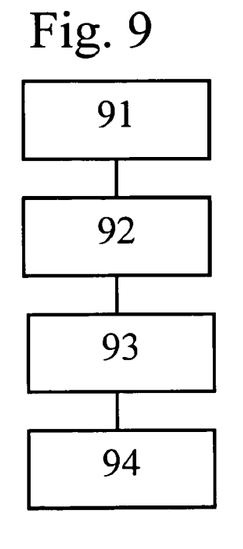
FIG. 9 shows handling of a tag search from hosts file goes as follows if the end point identifier is an address according to an embodiment of the invention.

FIG. 9 shows handling of a tag search from hosts file goes as follows if the end point identifier is an address according to an embodiment of the invention, with the following steps:
91. Check that there is an alias for the host name. Select the first alias.
92. Check that the alias is at least five characters longer than the hostname.
93. Check that the alias ends with ".<hostname>.own". Remove this part from the string.
94. Check that the remaining string consist of hexadecimals. Apply mask to get the supported tag.

If the end point identifier is a hostname, make a reverse lookup first to get the address and then do the above four step checking with that address.

These changes can coexist with incompatible name resolution components. If a modified resolver reads an unmodified hosts file, it cannot find hostnames aliases that match the format described above. Therefore it cannot find any tag, and proceeds with checking the cache.

If an incompatible resolver reads a modified hosts file, it will properly resolve an address into a hostname and a hostname into an address. The only difference to an unmodified hosts file is that an additional alias is returned along with the correct results. Reverse mapping from hostname or alias, including the artificial new alias, is not affected when using the hosts file. Only if the resolver would for some reason first resolve an address into an alias using the hosts file and then make an attempt to reverse map this into an address with a normal DNS query, there would be an error because top OD ".own" doesn't exist.

Name Resolver Cache

The name resolver cache contains trees of (question, answer) pairs of performed DNS queries, one for each name space. The root of the tree is the top-level OD and the branches contain the dot-separated parts of the rest of the hostname. The questions contain Namespace ID, OD name, DNS query type and DNS query class fields. TheQuery type is the same as DNS resource record type, and is extended with a new data ownership type EDnsQtype_OWN The tree implementation is not visible outside of the name resolver cache. Support for the new query type is added to function CDndCache::FindL, which function returns a pointer to the answer.

Tag Query to a DNS Server

DNS servers maintain resource records such as hostnames and addresses. For example in the BIND DNS server implementation, configuration is stored in zone files that conform to a specific format. The ownership tag resolution related modifications should not cause any errors when incompatible resolvers query modified DNS server configuration, or when modified resolvers query unmodified configuration. The tag formats should also be consistent with other resource records, as well as the local resolver cache.

The OWN resource record contains the same tag parts as the additions to a hosts file. These are encoded into a total of eight hexadecimal characters. There is also an additional field that allows the administrator to specify the actual owner using a unique identifier such as social security number (SSN), resulting in entries of type "Hostname QueryType Tag OwnerID", for example: "host.example.com. OWN 00320000 1234567890".

If the end point identifier is a hostname, the DNS server finds and returns the fields of the OWN type entry with the matching hostname. If the end point identifier is an address, the resolver makes a reverse lookup to get the hostname and then proceeds as described above.

If a modified resolver reads an unmodified hosts file, it cannot find any OWN record for the host, and therefore returns no tag. If an incompatible resolver reads a modified zone file, it ignores any OWN records. Therefore, the changes do not cause problems with incompatible components.

The messages in DNS protocol require changes aligned with those presented above. The OWN RR format in the message will contain the following fields:

| | |
|---|---|
| NAME | (node name in dotted notation) |
| TYPE | (use "99" as in EDnsQType, although not assigned by IANA) |
| CLASS | (use "IN", i.e. Internet class) |
| TTL | (host specific, by default use same as for A or AAAA records) |
| RDLENGTH | (use 2 + 2 + 4 + 10 = 18 octets, although can vary based on OwnerID type) |
| RDATA | (tag contents: GlobalDefFlags, PrefFlags, Timestamp, OwnerID) |

EXAMPLE SCENARIOS

Messaging

The terminal has a messaging application that handles multiple types of messages such as SMS, Multimedia Messaging Service (MMS), Instant Messaging (IM), email, and presence notifications. Most of these are already using IP end point identifiers such as user MX records, hostnames or Universal Resource Identifiers (URIs). The user uses the same account for both work related and private messaging.

The user desires to avoid accidentally forwarding a message to the wrong OD. He allows copying and pasting of contents between items because that is not likely to happen by accident. Therefore the user is able to move message contents between the ODs if he does so intentionally.

The following sequence of events can occur:
1. User has configured sets of end points into the ODs in hosts file.
   Individual correspondents with MX records: family members and friends Network end points with A records: intranet, services, family and friend home nets
2. Application might also detect owner from attachment file headers
   Make two queries and apply the more restrictive decision (the one for mail, or for the attached file)
3. User receives an email message and at the time of reception the application's OPM client queries the OPM server to find out if it is possible to fetch the email. The application stores the owner index value that identifies the OD as part of the email headers.
4. User desires to reply to this work email and adds two extra recipients from address book. Application application's OPM client implicitly allows the default reply-to contacts, but checks that the message can be sent to the two extra recipients.
5. For both of the extra recipients, application application's OPM client queries the OPM server. In the query, it uses the stored owner index as a reference to the owner at the time the email was received. RDataOwnershipResolver::OwnershipQuery(QueryIndex, RefIndex)
6. OPM server responds to application with RDataOwnershipResolver::OwnershipResponse(QueryIndex, OwnerIndex)
7. Assume that the first extra recipient was a company colleague. The MX end point matches the company identifier stored in the hosts file, that is, the company DNS domain name.
   Decision is "access allowed", so the recipient is added.
8. Assume that the second extra recipient is a friend. The MX end point matches the friend identifier stored in the hosts file, that is, the friend's MX record.
   Decision is "access denied", so the recipient is not added
   Application creates a user dialog with a warning message and an option to change the recipient by reselecting from the phonebook.

The decision could also contain other commands based on owner tag, including:
"Duplicate" flag is 1 (no copies allowed) in the company tag:
   If not including the original message as quote: any "access allowed" recipients.
   If including the original message as quote: allow sending to only one of the "access allowed" recipients. Delete the received original email from inbox and delete the quoted part of the sent email in the "sent items" folder because there must be only one instance of the message.
"Integrity" flag is 1 (integrity protected) in the company tag:
   If not including the original message as quote: any "access allowed" recipients.
   If not including the original message as quote: any "access allowed" recipients but prevent the user from modifying anything in the quoted part.

If the user would like to export the message by moving it into an archive, saving it as a separate file, or sending to a printing queue, the application needs to attach the whole tag (including the OD name) to it.

Browser

The client terminal has a browser application capable of handling multiple types of interactive documents such as web pages, forms, chat rooms and web blogs. The end point identifiers are hostnames or URLs. The same browser is used for browsing both private services and for chatting with friends.

The user desires to prevent accidents where he would copy and paste parts of displayed documents to the wrong OD, while allowing it for public Internet content. The user also desires to prevent form filling using entries that were stored for another OD.

The following sequence of events takes place:
1. User configures sets of end points as A records into the ODs in hosts file.
2. User retrieves and opens a document. At the time of reception, the application's OPM client queries the OPM server to find out if the application can display the document. The application stores the owner index value that identifies the OD in an internal register that keeps track of the currently cached content.
   If the document is a form and the user subsequently enters data into it, the same owner index value is also attached to the cached form entries.
3. User desires to copy an interesting piece of text from a browsed document of his friend to a chat room. Application's OPM client checks that the text can be copied.
4. The application's OPM client queries the OPM server. In the query, the application uses the stored owner index as reference to the owner. RDataOwnershipResolver::OwnershipQuery(QueryIndex, RefIndex)
5. OPM server responds to application with RDataOwnershipResolver::OwnershipResponse(QueryIndex, OwnerIndex)
6. Assume that the chat room is a public site. The original end point matches the friend identifier stored in the hosts file (the DNS host name of the friend's web server), but the target end point does not match any OD and is therefore "public internet".
   Decision is "access denied", so the text cannot be pasted.
   Application creates a user dialog with a warning message ("You were trying to copy your friend's private data to internet") and an option to copy-paste some different data by selecting another browser window, for instance.

The decision may also involve other commands based on owner tag, such as:
"Duplicate" flag is 1 (no copies allowed) in the friend's tag:
   Delete the document from cache even if the decision is "access allowed". Of course, the user may obtain the document later if the friend still has it available.
   If the destination OD is "public internet", an "access allowed" decision can also be changed to "access denied" because the receiving OD has no data ownership support and therefore can unwittingly copy the document.
"Integrity" flag is 1 (integrity protected) in the friend's tag:
   If a user attempts to copy the whole of the friend's document: "access allowed" decision remains.
   If a user attempts to copy only a part of the friend's document: any "access allowed" decision becomes "access denied". Application creates a user dialog with an option to copy and paste the whole document.

If the user would like to export the document by saving it as a file, or printing it, the application needs to attach the whole tag (including the OD name) to it.

Additional Use Scenarios

The invention can be used in a backup solution, where only company files that can be copied and are not temporary are backed up, whereas files owned by anyone else (e.g. downloaded from internet), or subject to major access restrictions, are ignored.

The invention can also be used in file exchange solutions such as peer-to-peer software, where files to and from identifiable friends and other known peers are treated differentially from other peers' files.

Owner Identifier

The identifier that allows one to claim ownership of a piece of data should be scalable and exportable to other nodes. Such a universally usable ID needs to be unique. Hence, the ID space needs to be administered. Further, as the ID ultimately can define an owner, that is a legal entity, the ID should be based on country specific registries of natural and legal persons (such as organizations). On the other hand, anyone wishing to remain anonymous can simply omit such ownership marking.

Owner Preference

The owner preferences are in their simplest form mere "yes/no" flags for a given criterion. The effect of each preference then needs to be aligned with this Boolean logic. On the other hand, because the mechanism is best effort based, there can be both hard (explicit) and soft preferences. This also means that the preferences can be subject to interpretation.

The owner preference flags intended for us in data ownership contain parts that manage the interpretation of the tag, whereas others are the actual preferences related to the data. The interpretation of some flags can also depend on the values of other flags.

The preference flags are as follows (flag name, value when zero and value when one):

version 0: basic 1: extended indicates whether there are additionaowner rules interpretation 0: best effort 1: strict indicates whether best effort is sufficient for tag compliance duplication 0: multiple 1: single indicates whether there can be multiple instances of data distribution 0: unlimited 1: bounded indicates whether data can be delivered to its destination OD granularity 0: aggregate 1: detailed indicates whether the destination OD is defined narrowly integrity 0: modifiable 1: static indicates whether data can be modified or transformed inheritance 0: voluntary 1: mandatory indicates whether ownership of modified data should change permanence 0: storable 1: transient should data can be stored for later use The owner preferences can therefore be described with just one byte, with 0x00 as the default value. Some of the effects related to the preferences require taking into account a combination of flags:

| Duplication and distribution flags | |
|---|---|
| 00 | copy to anyone ok |
| 01 | copy within OD ok |
| 10 | forward to anyone ok |
| 11 | forward within OD ok |

| Distribution and granularity flags | |
|---|---|
| 00 | delivery to anyone ok |
| 01 | delivery to anyone in related ODs ok |
| 10 | delivery only to parent OD members ok |
| 11 | delivery only to explicit OD members ok |

| Integrity and inheritance flags | |
|---|---|
| 00 | ok to modify and possess data |
| 01 | ok to modify but keep previous ownership |
| 10 | not modifiable but ownership can be possessed |
| 11 | content and ownership not modifiable |

Owner Classification

Some of the tag contents can be globally unambiguous whereas others may remain within a terminal internal scope. The owner definition conveys context information about the owner to the terminal, and can have both global and local scope parts. The owner definition can be used in owner classification for the data. Each definition can be described with just one byte, with 0x00 as the default value.

The global definition flags may be as follows (flag name, value when zero and value when one):

version 0: basic 1: extended indicates whether there are additional parts in the definition scope 0: global 1: local indicates whether the owner ID is provided by a registrar or a terminal source 0: online 1: offline indicates whether the owner ID is used by IP stack or other I/O encoding 0: legacy 1: standard indicates whether the owner ID space is patched together from old IDs, or is a new unified ID type person 0: natural 1: legal indicates whether the owner is an individual or an organization timetype 0: original 1: access indicates whether the timestamp refers to data owner ID creation or modification timescale 0: date 1: time indicates whether the timestamp for the data owner ID is in days or minutes timescale originality 0: creator 1: ambiguous indicates whether the owner ID describes the author or distributor of data Some of the definitions require taking into account a combination of flags:

| 1. Scope and source flags | |
|---|---|
| 00 | default: compressed, unique DNS domain/host name |
| 01 | compressed, unique country specific registered entity |
| 10 | terminal internal composite ID |
| 11 | terminal internal relative index |

| 2. Scope, source and encoding flags | |
|---|---|
| 000 | legacy (base36), IDLen <1300 (general purpose bit compressed) |
| 001 | IDN (Unicode), IDLen <~2k-3k (general purpose bit compressed) |
| 010 | legacy (Huffman compressed CC + VATID/EIN/SSN/ITIN), IDLen 64 |
| 011 | reserved for future use, e.g. unified global natural/legal person registry |
| 10x | reserved for future use, e.g. provider/operator resolved registry |
| 11x | index, IDLen 8 bit (010) or 16 bit (011) |

| 3. Scope and person flags | |
|---|---|
| 00 | default: scope, source and encoding flags describe SSN/ITIN or user@domain |
| 01 | scope, source and encoding flags describe VATID/EIN or OD |
| 10 | user's own data |
| 11 | user's data belonging to organization |

| 4. Timetype and timescale flags | |
| --- | --- |
| 00 | default: original creation date (e.g. 1900 + days) |
| 01 | transient data with limited validity period |
| 10 | owner resolvable (from DNS name on this day) |
| 11 | distributed data with limited validity period |

| 5. Person and originality flags | |
| --- | --- |
| 00 | default: owner authored data |
| 01 | owner's shared or modified data |
| 10 | organization's automatically generated data |
| 11 | data possessed by organization |

The local definition flags are as follows (flag name, value when zero and value when one):

version 0: basic 1: extended indicates whether there are additional parts in the definition reception 0: remote 1: local indicates whether the owned data was received from network or sensors accuracy 0: derived 1: exact indicates whether the owner ID was derived or known authentication 0: weak 1: strong indicates whether the owner ID was estimated or verified relation 0: unrelated 1: related indicates whether the owner is member of the same organization as the user authority 0: individual 1: shared indicates whether the ownership of owner over the data is complete or partial purpose 0: private 1: commercial indicates whether the nature of the ownership is profit or non-profit exposure 0: system 1: services indicates the degree of owner accessibility to data Some of the definitions require taking into account a combination of flags, both global and local owner definitions:

| 1. Scope and accuracy flags | |
| --- | --- |
| 00 | default: ID from session end point resolution etc. |
| 01 | ID embedded in data or retrieved from authority |
| 10 | ID inferred from selectors or patterns |
| 11 | ID resolved from authoritative local mapping |

| 2. Accuracy and authentication flags | |
| --- | --- |
| 00 | default: resolution using ambiguous inputs |
| 01 | resolution based on unique, verifiable inputs |
| 10 | untrusted ID verifier |
| 11 | trusted ID verifier |

| 3. Person and relation flags | |
| --- | --- |
| 00 | default: owner is single independent of user |
| 01 | owner is individual related to user |
| 10 | user has no membership in owner organization |
| 11 | user is member of owner organization |

| 4. Originality and authority flags | |
| --- | --- |
| 00 | default: owner is external individual |
| 01 | external data ownership is shared |
| 10 | data owned by user |
| 11 | user shares ownership with others |

Applicability

Data ownership can be used for many purposes. The primary use described in this description is access control for inbound and/or outbound data. Data ownership can also be used for access control in inter-process communication, where a process can check if the data can be sent to a receiving process.

Control over the use of local resources is another main use for data ownership. Especially policies and configurations can arrive from multiple sources and it is necessary to apply the policies by different owners that are not in conflict with each other. With a simple tag structure and subjective rules interpretation, it is typically possible to also combine policies from different sources.

DRM and Data Ownership

The invention differs from typical digital rights management (DRM) mechanisms mostly due to best effort approach. The assumption is that users have motives to respect the ownership and restrictions of some types of data, and that this sensitivity can be carried over to other types of data by default. The mechanism is open by default and allows progressively more recipient rights to be restricted. The same standard tags are used for any type of data. The needs for reuse, inclusion, referrals or integrity of data are also addressed. This means that data ownership works in parallel with and can complement DRM. It could also be translated into DRM mechanisms if necessary, for example for exporting data to a node that is known not to support data ownership.

Owner rights management based on tags could be done roughly as follows:

Reuse: combination of the below functions if allowed
Inclusion: if transformed, decide owner ID modification
Referral: owner ID enclosed, for aggregates use OD ID
Integrity: use integrity bit to choose if transform ok Data ownership could allow DRM to be used in completely new areas or in new ways:

1. Ownership tags placed into HTML tags: one at the header and exceptions (without time, owner ID) into e.g. paragraph or list tag. Browser could control how the whole document or a specific paragraph is handled
   Integrity requirement prevents partial copying (need to quote correctly)
   Document is copy-restricted, but one list of numbers is not
   In a company document, one paragraph is company internal only
2. Tag based control of media stream: each tag always defines treatment of data until the next tag is processed
   First tag allows copying and distribution, sets license terms inclusion
   Second tag after 30 seconds disallows copying, therefore the first 30 seconds become a marketing sample (but license IP rights belong to author)

Say that a user takes a picture and phone annotates it with time and location data. When sent to a friend, the annotations are restricted (no distribution or copy outside friend's domain) whereas picture's tag allows forwarding—this protects user's privacy to a typically sufficient extent.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. A number of features were described as part of examples in the foregoing and wherever technically possible, the features should be regarded as optional and combinable with any different other examples of the description. For instance, the invention is useful also in various electronic devices, particularly in portable electronic books, PDA devices, gaming devices, music players, DRM enabled set-top boxes capable of providing limited access to (rented) content and GPS positioning devices. Hence, the scope of the invention is only restricted by the attached patent claims.

I claim:

1. An apparatus comprising at least one processor; and at least one memory including computer program code, the at least one memory and the computer program code configured to, with the at least one processor, cause the apparatus to perform at least the following:
in response to a request to transfer a message from a user comprising access controlled information, to send a query requesting permission to transfer the information in a data network, the query comprising identification of an owner of rights in the information, identification of at least one intended target of the message and identification of previously determined permissions regarding traffic comprising the information, where access to the information is controlled in accordance with the rights;
in response to sending the query, to receive permissions regarding transfer of the information for each of the at least one intended target;
providing the information with control data that comprises a binary representation of data handling conditions intended to govern access to the information; and
to transfer the message to each of the at least one intended target in accordance with the permissions received.

2. The apparatus according to claim 1, wherein the at least one memory and the computer program code are further configured to cause the apparatus to perform any one of the following: merging binary representation of data handling conditions, copying binary representation of data handling conditions or deriving binary representation of data handling conditions from other binary representations of data handling conditions.

3. The apparatus according to claim 1, wherein the apparatus resides at one of: a client device, a data server and a dedicated networked unit accessible to the client device.

4. The apparatus according to claim 1, wherein the at least one memory and the computer program code are further configured to cause the apparatus to function as a messaging agent.

5. The apparatus according to claim 4, wherein the at least one memory and the computer program code are further configured to cause the apparatus to add or update the handling conditions on at least one of: receiving of the message and sending of the message.

6. The apparatus according to claim 1, wherein the at least one memory and the computer program code are further configured to cause the apparatus to query a server for the handling conditions.

7. The apparatus according to claim 1, wherein the at least one memory and the computer program code are further configured to cause the apparatus to query a domain name server for the handling conditions.

8. The apparatus of claim 1, wherein the at least one memory and the computer program code are further configured to cause the apparatus, when transmitting the message to each of the at least one intended target in accordance with the permissions received:
to determine whether the permissions received comprise an indication that integrity is to be protected; and
to prevent modification of the information in response to determining that the permissions received comprise the indication that integrity is to be protected.

9. The apparatus of claim 1, wherein the at least one memory and the computer program code are further configured to cause the apparatus, when transmitting the message to each of the at least one intended target in accordance with the permissions received:
to determine whether the permissions received comprise an indication that no copies allowed; and
to transfer the message to only one of the at least one intended target and to delete a copy of the information in response to determining that the permissions received comprise the indication that no copies allowed.

10. The apparatus of claim 1, where the message is one of: an instant messaging message, an email message, a multimedia messaging service message, a web page and a web blog.

11. A method comprising:
in response to a request to transfer a message from a user comprising access controlled information, sending a query requesting permission to transfer the information in a data network, the query comprising identification of an owner of rights in the information, identification of at least one intended target of the message and identification of previously determined permissions regarding traffic comprising the information, where access to the information is controlled in accordance with the rights;
in response to sending the query, receiving permissions regarding transfer of the information for each of the at least one intended target;
providing the information with control data that comprises a binary representation of data handling conditions intended to govern the access to the information; and
transferring the message to each of the at least one intended target in accordance with the permissions received.

12. The method according to claim 11, further comprising any one of the following: merging binary representation of data handling conditions, copying binary representation of data handling conditions or deriving binary representation of data handling conditions from other binary representations of data handling conditions.

13. The method according to claim 11, wherein the method is performed by one of: a client device and a data server.

14. The method according to claim 11, further comprising adding or updating the handling conditions on at least one of: receiving of the message and sending of the message.

15. The method according to claim 11, further comprising querying one of: a server and a domain name server for the handling conditions.

16. The method of claim 11, where transmitting the message to each of the at least one intended target in accordance with the permissions received comprises:
determining whether the permissions received comprise an indication that integrity is to be protected; and
preventing modification of the information in response to determining that the permissions received comprise the indication that integrity is to be protected.

17. The method of claim 11, where transmitting the message to each of the at least one intended target in accordance with the permissions received comprises:
- determining whether the permissions received comprise an indication that no copies allowed; and
- transferring the message to only one of the at least one intended target and to delete a copy of the information in response to determining that the permissions received comprise the indication that no copies allowed.

18. The method of claim 11, where transmitting the message to each of the at least one intended target in accordance with the permissions received comprises:
- determining whether the permissions received comprise an indication that no copies allowed; and
- transferring the message to only one of the at least one intended target and to delete a copy of the information in response to determining that the permissions received comprise the indication that no copies allowed.

19. A non-transitory computer readable medium tangibly encoded with a computer program executable by a processor to perform actions comprising:
- in response to a request to transfer a message from a user comprising access controlled information, sending a query requesting permission to transfer information in a data network, the query comprising identification of an owner of rights in the information, identification of at least one intended target of the message and identification of previously determined permissions regarding traffic comprising the information, where access to the information is controlled in accordance with the rights;
- in response to sending the query, receiving permissions regarding transfer of the information for each of the at least one intended target;
- providing the information with control data that comprises a binary representation of data handling conditions intended to govern access to the information; and
- transferring the message to each of the at least one intended target in accordance with the permissions received.

20. The computer readable medium according to claim 19, where the actions further comprise at least one of: merging binary representation of data handling conditions, copying binary representation of data handling conditions and deriving binary representation of data handling conditions from other binary representations of data handling conditions.

21. A method comprising:
- in response to a request to transfer a message comprising a copy of access controlled information, sending a query requesting permission to transfer the copy of the information in a data network, the query comprising identification of an owner of rights in the information, identification of at least one intended target of the message and identification of previously determined permissions regarding traffic comprising the information, where access to the information is controlled in accordance with the rights;
- in response to sending the query, receiving permissions regarding transfer of the copy of the information for each of the at least one intended target;
- determining whether the permissions received comprise an indication that integrity of the copy of the information is to be protected;
- in response to determining that the permissions received comprise the indication that integrity is to be protected, preventing modification of the copy of the information;
- providing the copy of the information with control data that comprises a binary representation of data handling conditions intended to govern the access to the information; and
- transferring the message to each of the at least one intended target in accordance with the permissions received.

* * * * *